April 16, 1968  R. MADELEY  3,377,833
METAL EXTRUSION PRESSES
Filed Sept. 20, 1965  3 Sheets-Sheet 1

INVENTOR
Robert Madeley
BY
Baldwin & Wight
ATTORNEYS

April 16, 1968  R. MADELEY  3,377,833
METAL EXTRUSION PRESSES
Filed Sept. 20, 1965  3 Sheets-Sheet 2

INVENTOR
By Robert Madeley
Baldwin & Wight
ATTORNEYS

United States Patent Office 3,377,833
Patented Apr. 16, 1968

3,377,833
METAL EXTRUSION PRESSES
Robert Madeley, Gloucester, England, assignor to Fielding & Platt Limited, Gloucester, England, a British company
Filed Sept. 20, 1965, Ser. No. 488,633
Claims priority, application Great Britain, Sept. 29, 1964, 39,642/64
5 Claims. (Cl. 72—263)

ABSTRACT OF THE DISCLOSURE

A metal extrusion press including a composite rotary die table for use in the extrusion of metals having different metallurgical characteristics, the table comprises a front and rear member which interlock with each other to allow simultaneous rotation and relative axial separation. The front member is provided with two pairs of die accommodation means, one pair for extrusion of, e.g. copper and the other for extrusion of, e.g. aluminium, the portion of the front member providing the said one pair of die accommodation means being equal in thickness to the total thickness of the composite table. The table is also provided with means for resisting eccentric loads imposed thereon by breaking the residue of an extrusion or by withdrawal of a burred extrusion discard.

---

This invention relates to metal extrusion presses and more particularly to such presses which utilise a rotary die table to facilitate locating dies in position in the press when an extrusion operation is to be carried out.

An object of the invention is to provide a rotary die table for use in the extrusion of dissimilar metals, for example, copper and and aluminium and according to the invention, a rotary die table includes a first main member, a second main member, and coupling means, said coupling means being arranged and adapted to couple said first and second members together for simultaneous rotation and to permit relative axial displacement thereof, said first main member being provided with a first die accommodation means adapted to accommodate a first set of metal-extrusion die assemblies and second die assembly accommodation means adapted to accommodate a second set of metal-extrusion die assemblies differing in their dimensions from the first die assemblies, said first die accommodation means being of thickness equal to the combined thickness of the second die accommodation means and said second main member, the thickness of the composite table being constant.

Figure 1:
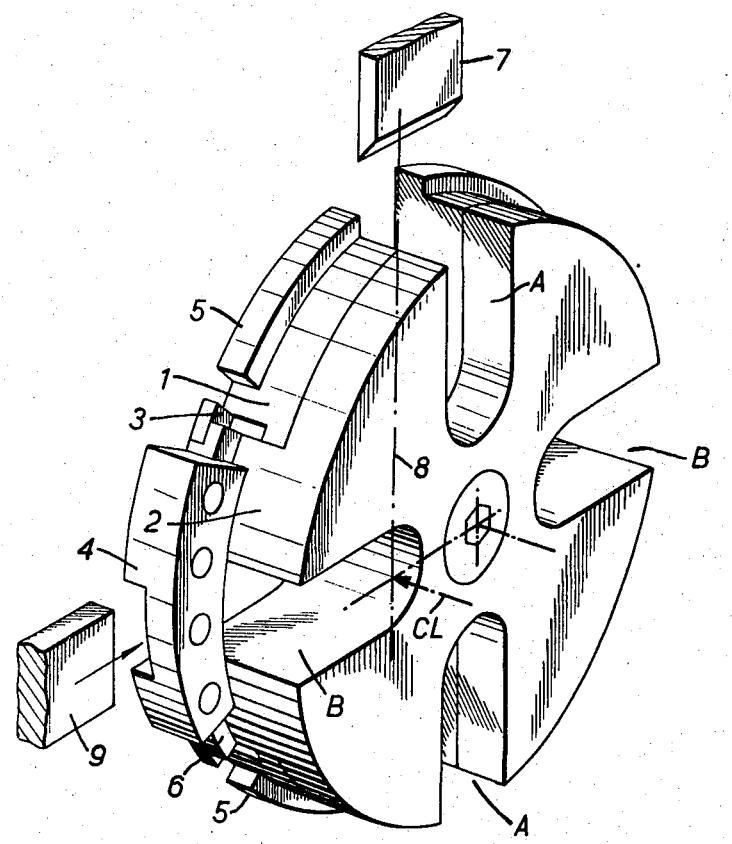
Figure 2:
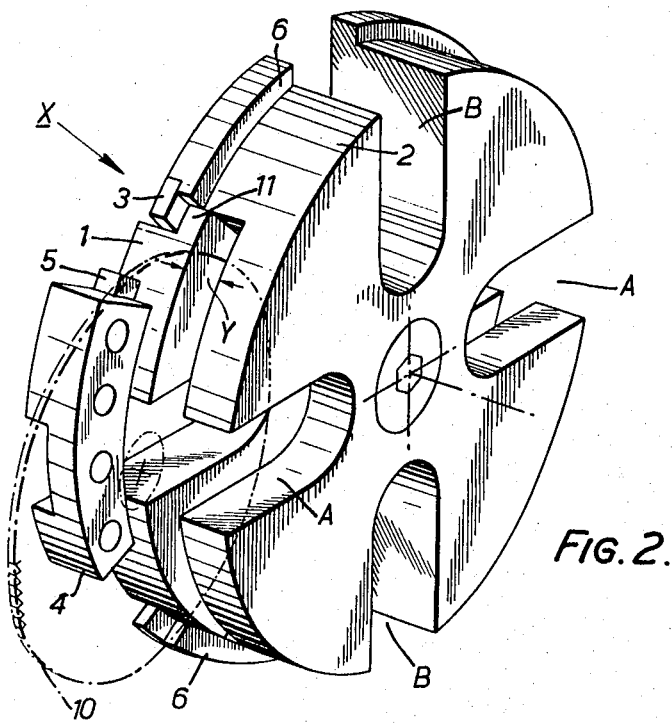
Figure 3:
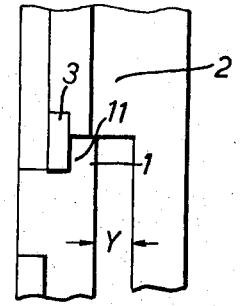
Figure 4:
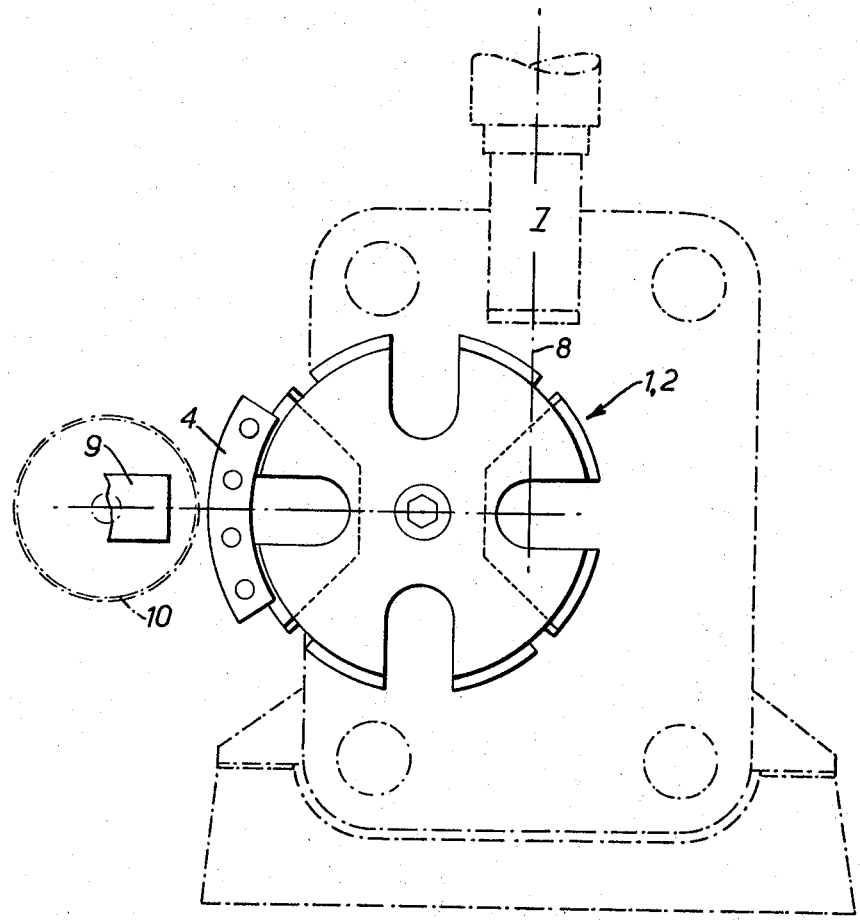

One form of rotary die carrier embodying the invention will now be described in greater detail by way of example with reference to the accompanying drawings in which:

FIGURE 1 is a diagrammatic perspective view of the die carrier showing the main components assembled together, FIGURE 2 is a diagrammatic perspective view of the die carrier showing the main components axially separated, FIGURE 3 is a fragmentary explanatory diagram; and FIGURE 4 is a diagrammatic end elevation of an extrusion press showing the die carrier mounted thereon.

Referring to the drawings, the rotary die table shown is of composite construction, comprising two main components, a rear table 1 and a front table 2. The front table 2 is keyed, in a manner to be described, into the rear table 1 so as to prevent independent rotation of the two components, but at the same time allowing the front table 2 to be moved axially away from the rear table 1. This axial movement is obtained by known means of hydraulic ram and cylinders, not shown. Rotation of the tables as a composite unit only is possible, such rotation being achieved by conventional means, not shown.

The composite table has four die positions enabling dies for aluminium to be fitted in the positions B and dies for copper extrusion to be fitted in positions A. The means for retaining the dies are not shown and any one of a number of known methods may be used. The direction of extrusion and the centre line of the extrusion ram are indicated by the broken arrowed line CL in FIGURE 1 which shows the table in a position for extruding aluminium, i.e. with one of the positions B in the extruding position. FIGURE 2 shows the table open for sawing behind the die after completion of copper extrusion, i.e. with one of the positions A in the extruding position.

In the case of aluminium extrusion it is necessary to use a die assembly which extends through the thickness of the table and accordingly the front table 2 is formed with segments equal in thickness to the total thickness of the combined table, thus allowing aluminium dies of the total table thickness to be accommodated. These segments also act as the keys to prevent rotation of one table with respect to the other. With some forms of aluminium extrusion such as port-hole or bridge die working, the residue of the aluminium within the die assembly is broken by moving the container away from the die. This action puts an eccentric load on the table and its central shaft which is resisted by providing stop lip 6 on the front table 2 which is retained by a fixed bridge piece 4. The bridge piece 4 prevents movement in the axial direction but allows the table to rotate.

Further in the case of aluminium extrusion it is also necessary when using conventional dies to shear the butt end of the extrusion off the die face. This shearing action, performed by a shear 7 operating on a centre line 8, is resisted by the insertion of a latch 9 through the bridge piece 4 into a locating recess on the table, this recess being provided by a slot at position B. By this means the shear force is resisted, thus preventing the composite table from rotating, and the table is also locked into the correct position.

The methods of working for copper extrusion are different from those for aluminium and it is usual to use a die assembly which can be divided to allow the extrusion to be cut immediately behind the extrusion die. Accordingly, FIGURE 2 shows the composite table in the position when copper is being extruded, i.e. 90° from the position for aluminium extrusion. The front table 2 will carry the die and the rear-table 1 will carry the usual backing up rings and holders, not shown. During extrusion the two tables will lie adjacent to each other and the die will be tight against the backing up rings. After extrusion has taken place the front table 2 can be moved away from the rear table 1, thus creating a gap shown at Y for the entry of a rotating circular saw blade 10 to cut the extrusion.

After the extrusion has been cut it is taken away down the run-out table of the press but a short portion of extrusion will still be attached to the butt end of the billet and this short end will have been burred by the cutting action of the saw. It will also have to be withdrawn away from the table through the extrusion die and in doing so will create a similar type of eccentric load on the table and its shaft as that described for aluminium extrusion. This eccentric load is also resisted by the same bridge piece 4, which in this case abuts a stop lip 5, formed on the rear table 1, and also via retaining strip-like plates 3 attached to the front table 2 which butt against the wall 11 of a recess in the rear table 1 limiting the amount of the gap Y. In FIGURE 3 these features are shown more clearly and as seen from the direction of the arow X in FIGURE 2.

Although not shown, provision is preferably made for the removal of sticking billets and this may be effected by fitting a loose sticker ring in any one of the die positions not in use during an extrusion operation.

It will be seen that the press described provides for the extrusion of either copper of aluminium or other metals of similar differing metallurgical characteristics the operations being carried out on a single press with resulting economy. Rotation of the composite table provides two extruding stations for copper extrusion and two extruding stations for aluminium.

I claim:

1. A composite rotary die table including a first main member, a second main member, and coupling means coupling said first and second members together for simultaneous rotation and permitting relative axial displacement thereof, said first main member being provided with a first die accommodation means adapted to accommodate a first set of metal-extrusion die assemblies and second die assembly accommodation means adapted to accommodate a second set of metal-extrusion die assemblies differing in their dimensions from the first die assemblies, said first die accommodation means being of thickness equal to the combined thickness of the second die accommodation means and said second main member, the thickness of the composite table being constant.

2. A composite rotary die table according to claim 1 in which said first and second main members are provided with corresponding stop means, each of said stop means being independently cooperable with a fixed bridge member thereby to resist eccentric loads imposed on the composite table.

3. A composite rotary die table according to claim 2 wherein during extrusion of a metal the stop means formed on the first main member cooperates with the fixed bridge member thereby resisting any eccentric load imposed on the table caused by breaking the residue of an extrusion.

4. A rotary die table according to claim 2 wherein during extrusion of a metal the stop means formed on the second main member cooperates with the fixed bridge member and after axial separation of the two main members, a retaining plate formed on the first main member abuts a wall of a recess formed in the second main member which together with the first mentioned cooperating means resists any eccentric load imposed on the table caused by withdrawal of a burred extrusion.

5. A rotary die table according to claim 2 wherein locking of the table in a particular working position is facilitated by means of a latch member being inserted through the bridge member and into a locating recess formed in the table.

References Cited

UNITED STATES PATENTS

| | | | |
|---|---|---|---|
| 2,896,782 | 7/1959 | Billen | 72—255 |
| 3,119,493 | 1/1964 | Zilgers | 72—263 |
| 3,139,183 | 6/1964 | Elkan | 72—255 |
| 3,156,359 | 11/1964 | Elger | 72—263 X |

CHARLES W. LANHAM, *Primary Examiner.*

K. C. DECKER, *Assistant Examiner.*